United States Patent [19]

Miles et al.

[11] 4,010,802

[45] Mar. 8, 1977

[54] WELL STIMULATION

[75] Inventors: Leon H. Miles, Plano; Ferman G. Martin, Irving, both of Tex.

[73] Assignee: Atlantic Richfield Company, Los Angeles, Calif.

[22] Filed: Oct. 28, 1975

[21] Appl. No.: 626,245

[52] U.S. Cl. .............................. 166/281; 166/294; 166/295

[51] Int. Cl.² ................ E21B 43/26; E21B 33/138

[58] Field of Search .......... 166/281, 295, 294, 308, 166/280

[56] References Cited

UNITED STATES PATENTS

| 3,695,355 | 10/1972 | Wood et al. | 166/295 |
| 3,757,862 | 9/1973 | Kern et al. | 166/280 |
| 3,800,847 | 4/1974 | Rike | 166/295 |
| 3,815,680 | 6/1974 | McGuire et al. | 166/281 |
| 3,929,191 | 12/1975 | Graham et al. | 166/308 |

*Primary Examiner*—Stephen J. Novosad
*Assistant Examiner*—George A. Suchfield
*Attorney, Agent, or Firm*—Roderick W. MacDonald

[57] ABSTRACT

A method for stimulating an unconsolidated formation in a well wherein the unconsolidated formation is fractured in the unconsolidated state, i.e., without having had any prior consolidation treatment practiced thereon, the fracturing step employing a propping agent, and consolidating essentially only a portion of said propping agent in the fractures created by the fracturing step. The unconsolidated formation remains essentially unconsolidated after the method of this invention has been completed.

9 Claims, 1 Drawing Figure

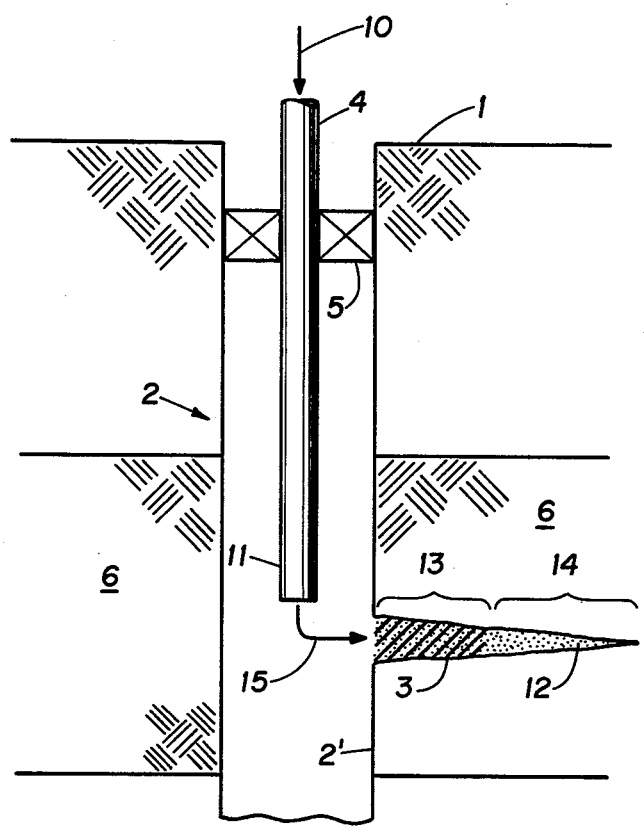

WELL STIMULATION

BACKGROUND OF THE INVENTION

Heretofore it has been taught that in the stimulation of an unconsolidated formation in a well the formation should first be consolidated in its entirety for several feet radially around the wellbore and, after this consolidation procedure has been completed, the formation should next be fractured employing a "tackifying" agent in the fracture fluid. When this process is completed, the formation, as well as all the propping agents in the fractures, has been completely consolidated. This procedure is fully and completely disclosed in U.S. Pat. No. 3,815,680, issued June 11, 1974, the disclosure of which is incorporated herein by reference.

SUMMARY OF THE INVENTION

According to this invention an unconsolidated or incompetent formation in a wellbore is stimulated essentially without any consolidation of the formation itself. The method of this invention consolidates only a portion of the propping agent in the fracture itself, the portion of the propping agent consolidated being that portion closest to the wellbore. Thus, in accordance with this method and contrary to the prior art, even a substantial portion of the propping agent in the fracture is not consolidated. The consolidation of the propping agent in the fractures in accordance with this invention can be carried out during the latter stages of the fracturing process itself or even after the fracturing process has been completed.

Accordingly, it is an object of this invention to provide a new and improved method for stimulating an unconsolidated formation in a wellbore. It is another object by the new and improved method for fracturing an unconsolidated formation. It is another object to provide a new and improved method for a combination fracturing and consolidating procedure. Other aspects, objects and advantages of this invention will be apparent to those skilled in the art from this disclosure and the appended claims.

DETAILED DESCRIPTION OF THE INVENTION

The drawing shows a cross section of a wellbore in which the method of this invention is carried out.

More specifically, the drawing shows the earth's surface 1 having a wellbore 2 therein, wellbore 2 having a fracture 3 therein. Conduit means 4 such as drill pipe, tubing and the like is provided for communicating between the earth's surface and the vicinity of the wellbore adjacent fracture 3. Packoff means 5 is provided in the annulus between the outside of conduit 4 and the wall of the wellbore so that fluid under pressure introduced into the wellbore in the vicinity of fracture 3 will pass into the fracture and not back to the earth's surface in such annulus.

Formation 6 represents an unconsolidated formation which initially does not contain any fractures like fracture 3. In accordance with this invention, formation 6 is not treated to consolidate that formation as required by the prior art, but rather is fractured in its original unconsolidated state by passing a conventional fracture fluid through conduit 4 in the direction of arrow 10 so that the fracturing fluid leaving the conduit 4 at its lower end 11 is under sufficient pressure to create a fracture or crack 3 in formation 6.

As is conventional in well fracturing procedures, at least part of the fracturing fluid introduced into the wellbore contains a propping agent. The propping agent is a solid particulate material that flows into the fracture itself so that the propping agent keeps the fracture open when the pressure on the fracturing fluid in the wellbore is removed and the fracture tends to close again due to its overburden pressure. Any suitable propping agent can be used, for example, gravel, sand, combinations thereof, and the like. Ordinarily, numerous fractures are formed in a formation when subjected to a fracturing process, but only a single fracture 3 is shown in the drawing for simplicity's sake. However, this invention is applicable to all fractures formed in the unconsolidated formation 6 whatever their orientation or configuration or member may be.

To help stabilize propping agent 12 in fracture 3 so that it will not tend to flow back into the wellbore to any substantial extent, in accordance with this invention, a portion of propping agent 12, which portion is nearest the wellbore wall 2' (i.e., portion 13 in the drawing) is consolidated thereby leaving formation 6 and the remainder of propping agent 12 essentially in their original unconsolidated state.

In accordance with this invention, all propping agent 12 in fracture 3 is not consolidated. Only a portion is consolidated. Thus, in the drawing the portion of fracture 3 furthest from the wellbore, i.e., portion 14, is unconsolidated like formation 6.

The amount of propping agent consolidated in any given fracture will vary widely depending on the propping agent, the consolidating agent, the characteristics of the formation, and the like so that it is impossible to quantify the amount of propping agent that should be consolidated for all cases. However, a substantial amount, but less than all, of the propping agent in each fracture is consolidated in accordance with this invention. The portion that is consolidated is that portion closest to the wellbore, and generally covers less than 25% of the propping agent in each fracture.

Consolidation of the propping agent can be carried out after the fracturing and propping procedure has been completed. Thus, after propping agent 12 has been injected into fracture 3, consolidating agent can be injected into conduit 4 and which upon leaving lower end 11 will pass as indicated by arrow 15 preferentially into the more permeable (porous) fracture 3 and penetrate along part of the length of fracture 3. The desired distance of penetration can be controlled to be less than the full length of the fracture, for example, the distance represented by zone 13. Thereafter, the consolidation step is terminated.

Alternatively, the consolidation procedure can be carried out during a latter part of the fracturing process. That is to say the fracturing fluid will initially contain no consolidating agent but near the end of the fracturing process, consolidating agent can be incorporated into the latter part of the portion of the fracturing fluid which contains propping agent. This way the consolidating agent passes into fracture 3 in zone 13 along with the latter part of the propping agent 12 to give the same ultimate results shown in the drawing, i.e., a zone of propping agent near the wellbore that is essentially consolidated while the remainder of the propping agent in the fracture is unconsolidated.

Any conventional fracturing fluid and consolidating agent can be employed, all being well-known in the art. The tackifying agents of U.S. Pat. No. 3,815,680 can be employed as consolidating agents. In like manner the consolidating materials disclosed in U.S. Pat. No. 3,285,339, issued Nov. 15, 1966, the disclosure of which is incorporated herein by reference, can also be employed as consolidating agents in this invention.

Generally, consolidating agents which are essentially insoluble in the fracturing fluid are employed, although consolidating agents that could be precipitated from the fracturing agent in situ in the fracture could be employed in the method of this invention. It is also preferred, although not required, that the consolidating agent have an affinity for the propping agent.

Generally, the consolidating agent can be selected from a group of materials comprising thermosetting resins, thermoplastic polymers, rubber, wax, simple syrups, combinations of two or more thereof, and the like. Particularly suitable materials include, without limitation, phenol formaldehyde resin, furan resin, cellulose resin, styrenebutadiene rubber, reclaimed rubber, modified resins, residual hydrocarbon oils, heavy hydrocarbon oils, and the like.

In some situations wherein a consolidating agent is employed in conjunction with the latter part of the fracturing fluid, the consolidating agent can constitute from about 2 to about 20 weight percent of the total weight of the propping agent which is mixed with the consolidating agent.

EXAMPLE

An unconsolidated formation 6 composed essentially of sand is fractured using a hydrocarbon (diesel oil) fracturing fluid containing gravel as the propping agent. Fracturing fluid is injected into the wellbore until the pressure exceeds the overburden pressure above formation 6 at which time fractures such as fracture 3 open and the gravel propping agent flows thereinto. After about three-fourths of the length of such fractures are filled with gravel, consolidating agent is injected along with the last of the propping agent that is to be injected so that a mixture of consolidating agent and gravel fills up the remaining one-quarter length of the fracture nearest the wellbore. After about six hours, the consolidating agent in the fracture has set up so that all the propping agent, both consolidated and unconsolidated, in fracture 3 will resist back flow from fracture 3 into wellbore 2 during the producing life of the well.

Note that formation 6 was not consolidated before fracturing and remains essentially unconsolidated except for possible trace amounts of consolidating agent that may leak from zone 13 of fracture 3 into immediately adjacent areas of the formation.

Reasonable variations and modifications are possible within the scope of this disclosure without departing from the spirit and scope of this invention.

The embodiments of the invention in which an exclusive property or privilege is claimed are defined as follows:

1. A method for stimulating an unconsolidated formation in a well comprising fracturing said formation without any prior consolidation treatment of said formation, the fracturing fluid used in said fracturing step at least initially containing no consolidating agent, at least a portion of said fracturing fluid containing at least one propping agent, and consolidating only a portion of said propping agent in the fractures created by said fracturing step by maintaining the portion of said fracturing fluid which contains propping agent initially devoid of consolidating agent and incorporating at least one consolidating agent into the latter part of the portion of said fracturing fluid which contains propping agent, said consolidating agent being incorporated in a sufficient portion of said latter part of fracturing fluid essentially to consolidate said propping agent in the fractures near said wellbore, whereby said unconsolidated formation remains essentially unconsolidated.

2. The method of claim 1 wherein a substantial amount, but less than all, of the propping agent in each fracture is consolidated, the portion consolidated being that portion closest to the wellbore.

3. The method of claim 2 wherein less than 25% of the propping agent in each fracture is consolidated.

4. The method of claim 1 wherein said consolidation of propping agent is carried out after said fracturing and propping procedure is completed.

5. The method of claim 1 wherein said consolidating agent is essentially insoluble in said fracturing fluid and has an affinity for said propping agent.

6. The method of claim 1 wherein said consolidating agent is selected from the group consisting of thermosetting resin, thermoplastic polymer, rubber, wax, simple syrup and combinations of two or more thereof.

7. The method of claim 1 wherein said consolidating agent is selected from the group consisting of phenol formaldehyde resin, furan resin, cellulose resin, styrenebutadiene rubber, reclaimed rubber, modified resins, residual hydrocarbon oils and heavy hydrocarbon oils.

8. The method of claim 1 wherein said propping agent is sand, gravel, or a combination thereof.

9. The method of claim 1 wherein said consolidating agent is added to a latter part of said fracturing fluid and said consolidating agent constitutes from about 2 weight percent to about 20 weight of the total weight of propping agent to which said consolidating agent is added.

* * * * *